US005506952A

United States Patent [19]
Choy et al.

[11] Patent Number: 5,506,952
[45] Date of Patent: Apr. 9, 1996

[54] METHOD AND SYSTEM FOR GUIDING THE FORMATION OF A CORRECTLY STRUCTURED INSTRUCTION FOR DATA PROCESSING SYSTEMS

[75] Inventors: Siu H. Choy, Bedford; Mary E. Miller, Southlake; Robert J. Torres, Colleyville, all of Tex.

[73] Assignee: International Business Machines Corporation, Armonk, N.Y.

[21] Appl. No.: 176,634

[22] Filed: Jan. 3, 1994

[51] Int. Cl.⁶ .................................................. G06F 15/00
[52] U.S. Cl. ........................... 395/159; 395/155; 395/156
[58] Field of Search .................................... 395/155–161, 395/700, 12; 345/117–120, 146, 902

[56] References Cited

U.S. PATENT DOCUMENTS

| | | | |
|---|---|---|---|
| 4,813,013 | 3/1989 | Dunn | 395/159 |
| 4,823,283 | 4/1989 | Diehm et al. | 395/156 |
| 4,901,221 | 2/1990 | Kodosky et al. | 395/161 |
| 4,956,773 | 9/1990 | Saito et al. | 395/161 |
| 5,040,131 | 8/1991 | Torres | 395/159 |
| 5,179,653 | 1/1993 | Fuller | 395/156 |
| 5,208,910 | 5/1993 | Higgins et al. | 395/156 |
| 5,261,043 | 11/1993 | Wolber et al. | 395/159 |
| 5,293,476 | 3/1994 | Wolber et al. | 395/159 |
| 5,301,301 | 4/1994 | Kodosky et al. | 395/159 X |
| 5,325,481 | 6/1994 | Hunt | 395/159 |

OTHER PUBLICATIONS

Chang, "Visual Languages", IEEE Software, Jan. 1987, pp. 29–39.
Edel, "The Tinkertoy Graphical Programming Environment", IEEE Trans. on Soft. Eng., Aug. 1988, pp. 1110–1115.
Hirakawa et al, "A Framework for Construction of Icon Systems", IEEE, pp. 70–77.
Yoshimoto et al, "Interactive Iconics Programming Facility in Hi-Visual", IEEE Workshop on Visual Languages, Jun. 1986, pp. 34–41.
F. Arefi, et al., "Automatically Generating Visual Syntax–Directed Editors", Communications of the Association of Computing Machinery, vol. 33, No. 3, pp. 349–360,.Mar. 1990.
"Visual Rule Construction", Research Disclosure, No. 346, p. 101, Feb. 1993.
G. Raeder, "Programming–In–Pictures: Implications on Software Development", International Symposium on New Directions in Computing, IEEE Computer Society, Aug. 1985.
"IBM SAA Common User Access Advanced Interface Design Guide", pp. 28–32, Jun. 1989.

*Primary Examiner*—Raymond J. Bayerl
*Assistant Examiner*—John E. Breene
*Attorney, Agent, or Firm*—Geoffrey A. Mantooth

[57] ABSTRACT

On a data processing system, complex instructions, such as expert system rules, for operating the data processing system are created by providing a guide for the correct formulation of the instructions. A set of components relating to elements and actions used to formulate the instructions is provided to visually represent the elements and actions. The components are displayed as icons. An instruction is constructed by moving selected icons into a rule construction area. A selection of components that may correctly be inserted into the instruction is provided at each stage of construction of the instruction. Components that may not correctly be inserted into the instruction are disabled. The disabled icons are visually provided as "grayed" icons. As the instruction is developed with additional icons, the selection of correct components changes to correspond to the changing instruction.

11 Claims, 8 Drawing Sheets

METHOD AND SYSTEM FOR GUIDING THE FORMATION OF A CORRECTLY STRUCTURED INSTRUCTION FOR DATA PROCESSING SYSTEMS

TECHNICAL FIELD OF THE INVENTION

The present invention relates to methods and apparatuses for guiding the construction of rules, which rules execute specified procedures on a data processing system.

BACKGROUND OF THE INVENTION

An expert system is a set of elements and procedures used to accomplish a specified task, or a series of closely related tasks. For example, procedures relating to sending, receiving, printing, forwarding, and other operations for dealing with electronic mail on a data processing system network can be considered an expert system. Expert systems are distinguished from lay systems by their complexity. An expert system is typically more complex in construction and even operation than a lay (or unexpert) system.

A major problem in operating conventional expert systems is the need for extensive training and specialized resources to achieve proper use. Conventional expert systems are typically so complex that specialized skills are required to operate the system. Typically, however, the ordinary user of the system has only a rudimentary knowledge of the system. For example, a typical user of an electronic mail system may know how to check to see if any incoming mail is awaiting retrieval. However, the typical user is incapable of setting up a procedure on the system that would automatically check to see if incoming mail is awaiting retrieval, and if so, would automatically print the mail on a printer.

The complexity of conventional expert systems is due to the requirement that the user be familiar with the rules governing the elements and procedures used in the expert system. Typically, however, the user has neither the time nor the desire to learn all of the rules relating to a particular expert system. This is especially true if the data processing system or the data processing network upon which the user is working has several expert systems in operation. Therefore, a typical user will not be able to fully utilize a conventional expert system unless the user has assistance from a person trained to operate the system.

Thus, there is a need for a method and an apparatus for guiding the construction of sequences of related elements and procedures for an expert system, which method and apparatus is simple and easy to operate for all users.

SUMMARY OF THE INVENTION

It is an object of the present invention to provide a method and apparatus for guiding the construction of sequences of related elements and procedures on a data processing system, which method and apparatus is easily understood and operated by a user of the data processing system.

The method and apparatus of the present invention provides a set of components which may be used to construct correctly structured instructions for a data processing system. The method provides a selection of components from the set of components where the components included in the selection of components are components that fit correctly within an instruction being developed by the user of the data processing system. The method then accepts a component selected by a user from the selection of components and inserts the selected component into the instruction being developed. Insertion of the selected component into the developing instruction changes the instruction, and changes the components of the set of components that fit correctly within the changed instruction. The method then provides a new selection of components that fit correctly within the changed instruction. Components are added to the instruction until the instruction is complete.

In accordance with one aspect of the present invention, the set of components for constructing instructions includes visually representing each component of the set of components with a respective identifying icon.

In still another aspect of the present invention, the selection of components is provided by enabling those components within the set of components for selection for insertion into the formative instruction and disabling those components of the set of components not included within the selection of components, so that the disabled components cannot be selected for insertion into the formative instruction. The disabled components are so indicated by reducing the visibility of those identifying icons that are associated with the disabled components.

In accordance with another aspect of the present invention, a user interface for building a rule on a data processing system is provided. The user interface has a rule construction area and a palette of icons for use in building the rule. The rule is executable by the data processing system. The icons include a source object, a subject object and an action object. The user interface also provides that one or more of the icons in the palette can be located within the rule construction area. After an icon has been located in the rule construction area from the palette, the palette is changed so as to indicate which icons are enabled for location from the palette to the rule construction area.

The present invention allows a user to build a rule in a simple and easy to understand manner. One example of a rule which can be constructed is an expert system. An expert system is a set of elements and procedures that are used to accomplish one or more tasks. Many operations on a data processing system can be complicated to untrained users and can therefore be considered expert systems. Such task's implemented by data processing systems typically require a specific structural syntax and particular elements and procedures in order to be successfully implemented. With the present invention, such an untrained user can easily construct the desired rule or set of instructions to implement the desired task without having to learn the necessary syntax, elements and procedures.

The present invention provides a user interface having a rule construction area and a palette of icons. The icons represent available elements and procedures for the desired task. The user can move an icon from the palette to the rule construction area to build a rule or set of instructions. The user can also edit the rule by removing an icon or changing its position within the rule.

After an icon is added to the rule, or after the rule is changed by removing an icon or changing the position of an icon, the palette of an icon changes to indicate which icons can now be inserted into the rule. Icons that can be inserted into the rule are displayed in their normal fashion. Icons that cannot be inserted into the rule are displayed in a gray fashion so as to indicate that those icons have been disabled and are unselectable. Thus, the user is prevented from selecting an incorrect icon. This provision of appropriate elements and procedures and the dynamic alteration of the choice of those elements and procedures guides the user in building a correct and implementable rule for execution on a data processing system.

After a rule has been built, it can be executed on the computer. The rule can be represented as an icon on the display.

BRIEF DESCRIPTION OF THE DRAWINGS

FIGS. 4A–4E are flow charts showing the present invention in accordance with a preferred embodiment.

DETAILED DESCRIPTION OF THE INVENTION

Figure 1:
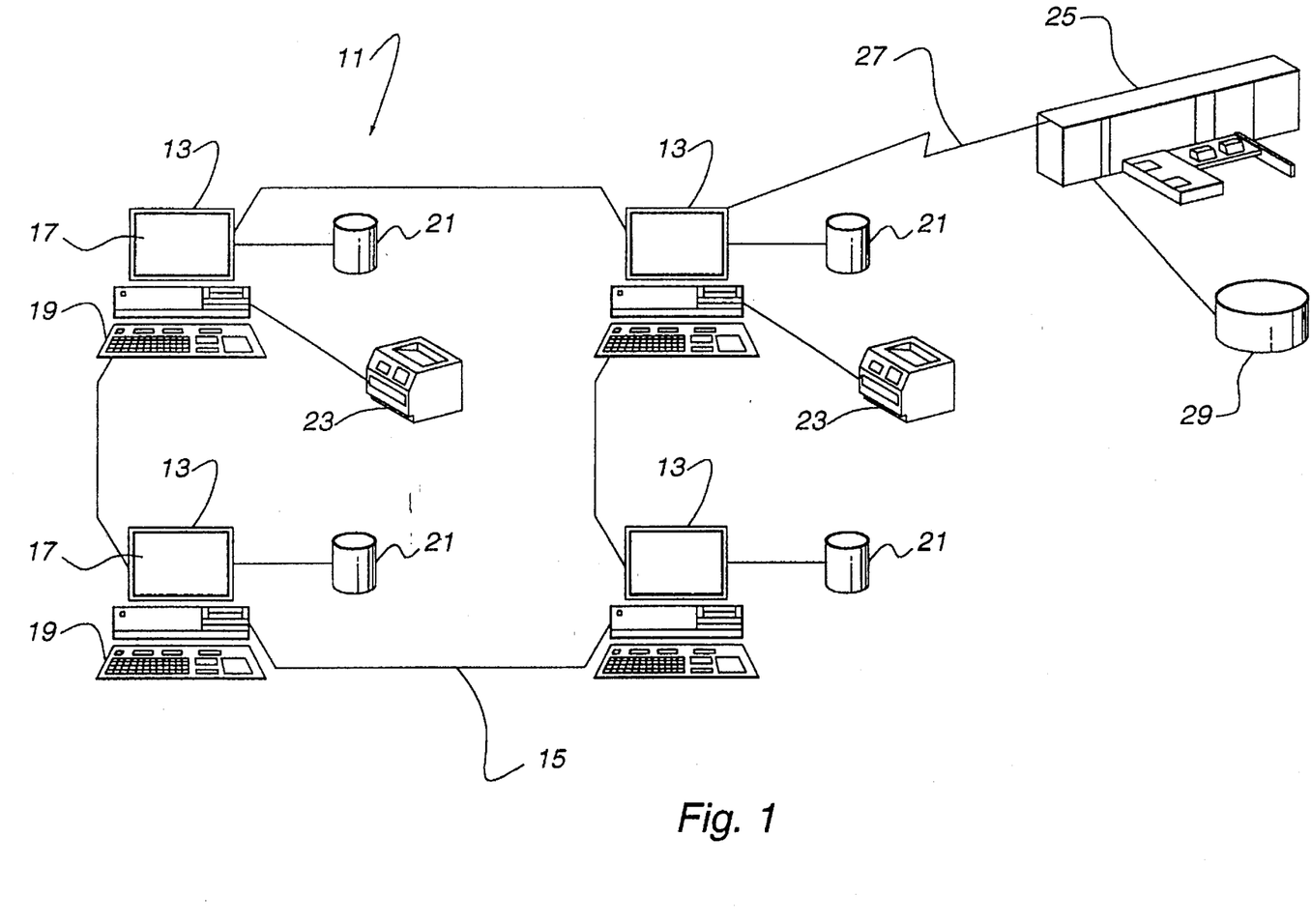
FIG. 1 is a schematic diagram of a data processing system on which the present invention can be practiced.

In FIG. 1, there is shown a schematic diagram of a data processing system network 11, upon which the present invention can be practiced. The data processing system network 11 includes plural individual computers or workstations 13 which are connected together in a local area network (LAN) 15. Each workstation 13 includes a user interface, which has a display screen 17, a keyboard 19 and a mouse (not shown). Each workstation 13 may also be coupled to a storage device 21 and to a printer or output device 23. One or more of such storage devices 21 may be utilized, in accordance with the present invention, to store or retrieve applications or resource objects which may be periodically accessed by any user within the data processing system 11. One such resource object is the guided rule building method illustrated in the flow charts of FIGS. 4A–4E.

Each workstation 13 contains a Central Processing Unit (CPU) and internal memory in the form of Random Access Memory (RAM) and Read Only Memory (ROM). The CPU executes resource objects such as the guided rule building method of the present invention. Before being executed, a resource object is loaded from a storage device into RAM.

The data processing system 11 may also include a mainframe or host computer 25 that is coupled to one of the workstations by a communication link 27. The computer 25 is also part of the network 15. The host computer 25 may also be coupled to a storage device 29 which may serve as a remote storage for the workstations.

The present invention provides a user interface that guides a user in the construction of an expert system, which expert system performs one or more tasks. The set of instructions that is built need not be an expert system. The user interface presents possible elements and procedures for use in the construction of an expert system. The elements and procedures are provided as icons on a palette. A user can combine the available elements and procedures in a variety of ways in a rule construction area in order to build an expert system. The present invention dynamically changes the icons that can be selected for placement into the rule. After the user places an icon into the rule, some icons on the palette may be made unavailable for a next instruction, in order to provide an implementable rule. Once an expert system is built, it can then be implemented on any of the workstations 13 or the host computer 25.

Figure 2:
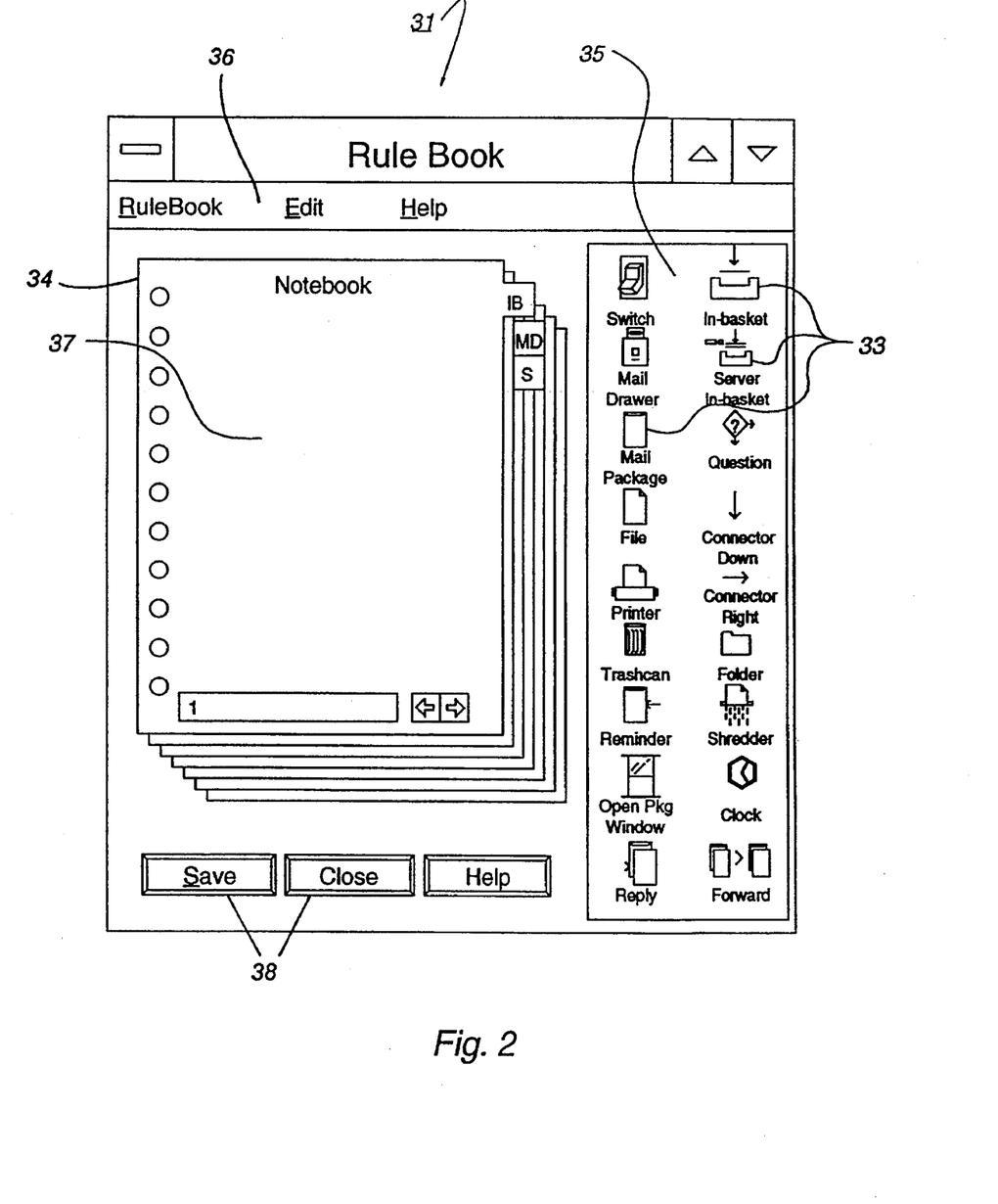
FIG. 2 is a user interface display illustrating the present invention showing a Rule Book display including a blank Notebook page and an icon palette.

In FIG. 2, there is shown an example of a user interface of the present invention. The user interface is a panel or window 31 entitled Rule Book. The Rule Book 31 illustrated in FIG. 2 can be used to define task rules in an electronic mail expert system. The Rule Book 31 is graphically represented on the workstation 13 in response to a workstation user's action to implement, modify or remove tasks relating to electronic mail at the workstation 13. The Rule Book 31 is displayed on the screen 17 (see FIG. 1). The Rule Book 31 has a palette 35 of available icons 33 to choose from, a rule construction area in the form of a notebook 34, and conventional window features such as a menu bar 36 and pushbuttons 38. Icons 33 on an icon palette 35 are used to visually represent elements and procedures of the electronic mail expert system. The method of FIG. 4B is used to create the user interface of FIG. 2.

The workstation user builds a task rule by selecting appropriate icons 33 from the palette 35 and locating them on a notebook page 37. Direct manipulation techniques are used to make copies of the icons 33 and locate them on a notebook page 37. Multiple notebook pages 37 are available in the notebook 34 so that multiple task rules may be created and stored thereon.

The Rule Book 31 guides the workstation user in the formulation of a correctly structure task rule. A correctly structured task rule is much like a correctly structured sentence, having a minimum number of elements and actions that must be sequenced properly to make sense. A task rule has an element to turn the rule on and off, a source element, an element to evaluate, an action, and elements to connect the above elements and actions. Other elements can be added. The Rule Book 31 ensures that the appropriate types of elements and actions are sequenced properly for successful implementation of the rule. The Rule Book 31 allows the workstation user to select any icon 33 which is appropriate at a particular point in the task rule "sentence" while preventing the selection of inappropriate icons by making the inappropriate icons inaccessible for selection.

Figure 3:
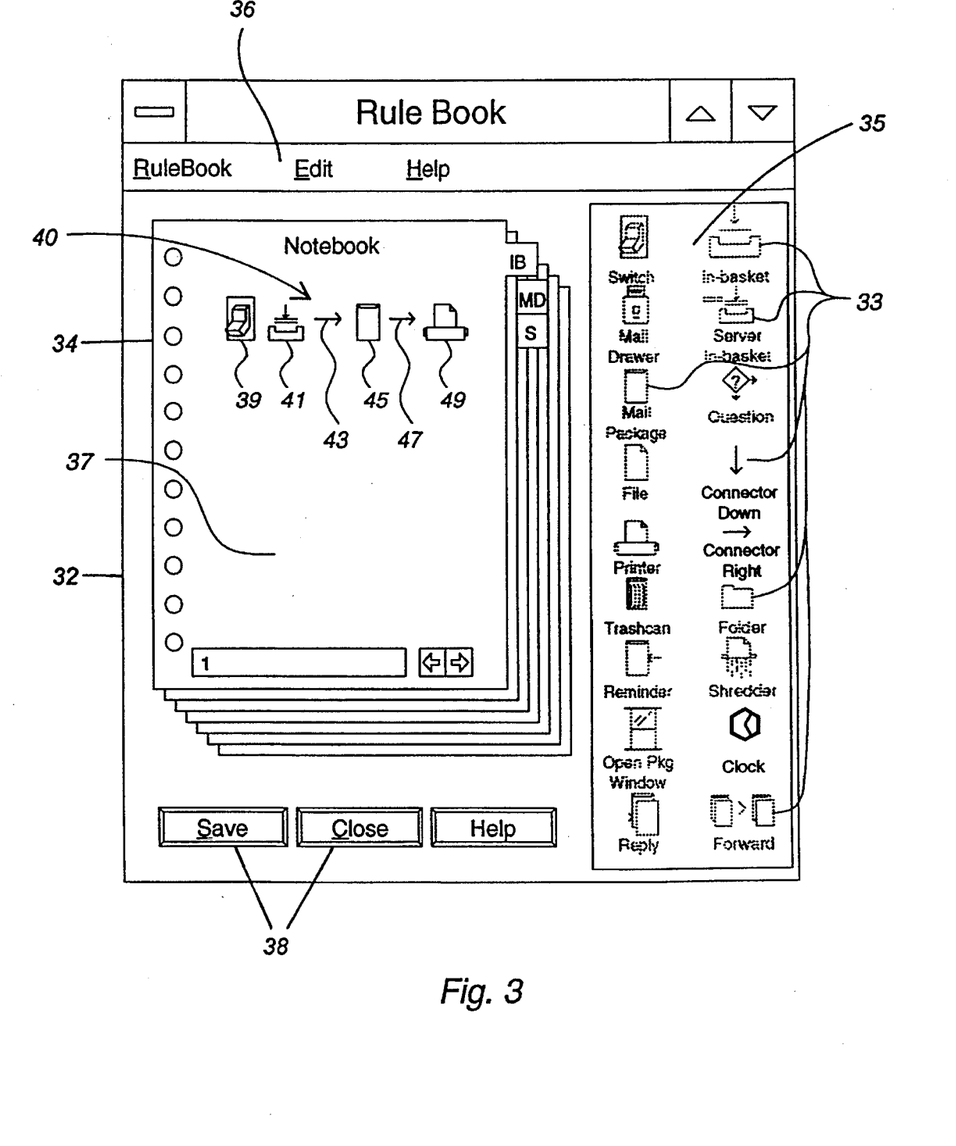
FIG. 3 is an example of a display of the present invention having a rule constructed thereon

A simple task rule 40 for an electronic mail expert system is illustrated by the Rule Book 31 shown in FIG. 3. The task rule 40 shown in FIG. 3 automatically directs incoming electronic mail to a printer for printing. The task rule was constructed by moving copies of icons 33 from the palette 35 to the notebook 37. Each icon was copied by, for example, providing a mouse pointer 42 on the icon of interest and then selecting that icon by pressing a mouse button and maintaining the pressed mouse button. A copy of the icon was then dragged from the palette to the notebook pages. The copy is then loaded on the notebook page by positioning the mouse cursor and copy at the desired location and then releasing the mouse button. The method of FIG. 4A processes such user inputs, while the methods of FIGS. 4C and 4D process direct manipulation operations of the icons. Other input techniques could be used as well.

A switch icon 39 was provided first so that the rule can be turned on and off. Then an in-basket icon 41 was located immediately after (to the right of) the switch icon 39. The in-basket icon 41 provides a source or base element from which an object may be retrieved. Next, a first connector right icon 43 was located to the right of the in-basket icon 41. A mail package icon 45 was then located to the right of the connector right icon 43. The connector right icon 43 connects the source icon 41 to the mail package icon 45, which represents an object for retrieval. The right connector icon 43 indicates that a mail package is to be retrieved from the in-basket. A second connector right icon 47 was located to the right of the mail package icon 45. Then, a printer icon 49 was located to the right of the second connector right icon 47. The second connector right icon 47 connects the mail-package icon 45 with a printer icon 49, which indicates that a printing action is to be undertaken. The second connector icon 47 indicates that the retrieved mail package is to be sent to a printer to be printed by that printer.

The selection limitation of icons on the palette for proper rule construction can be observed in FIG. 3. Each icon 33 that may properly be inserted into the rule is easily visible, while icons 33 that would cause the formation of an invalid rule are "grayed" out and are much less visible than proper icons 33. "Grayed" out icons 33 cannot be selected for insertion into the rule. In FIG. 3, the printer icon 49 is the last icon of the rule 40. After an icon 33 is located and released on the notebook page 37, the palette 35 changes to display selection limitations. If, for example, creation of a more complex rule is desired, only the easily visible connector down icon, connector right icon, and clock icon are appropriate for insertion into the rule following the printer icon. The remaining "grayed" out icons 33 (for example, the trashcan icon, the printer icon, etc.) may not be inserted into the rule following the printer icon 49. Insertion of one of the connector icons or the clock icon into the rule would change the rule, therefore the Rule Book 31 would provide a new selection of appropriate icons based on the changed rule. The method of FIG. 4E dynamically changes the palette 35 to display enabled and disabled icons.

In FIGS. 4A–4E are shown flow charts. In the flow charts, the following graphical conventions are observed: a rectangle for either a process, function or screen display, a diamond for a decision, and a circle for an off page connector in exiting to or entering from another part of the flow chart. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

Figure 4A:
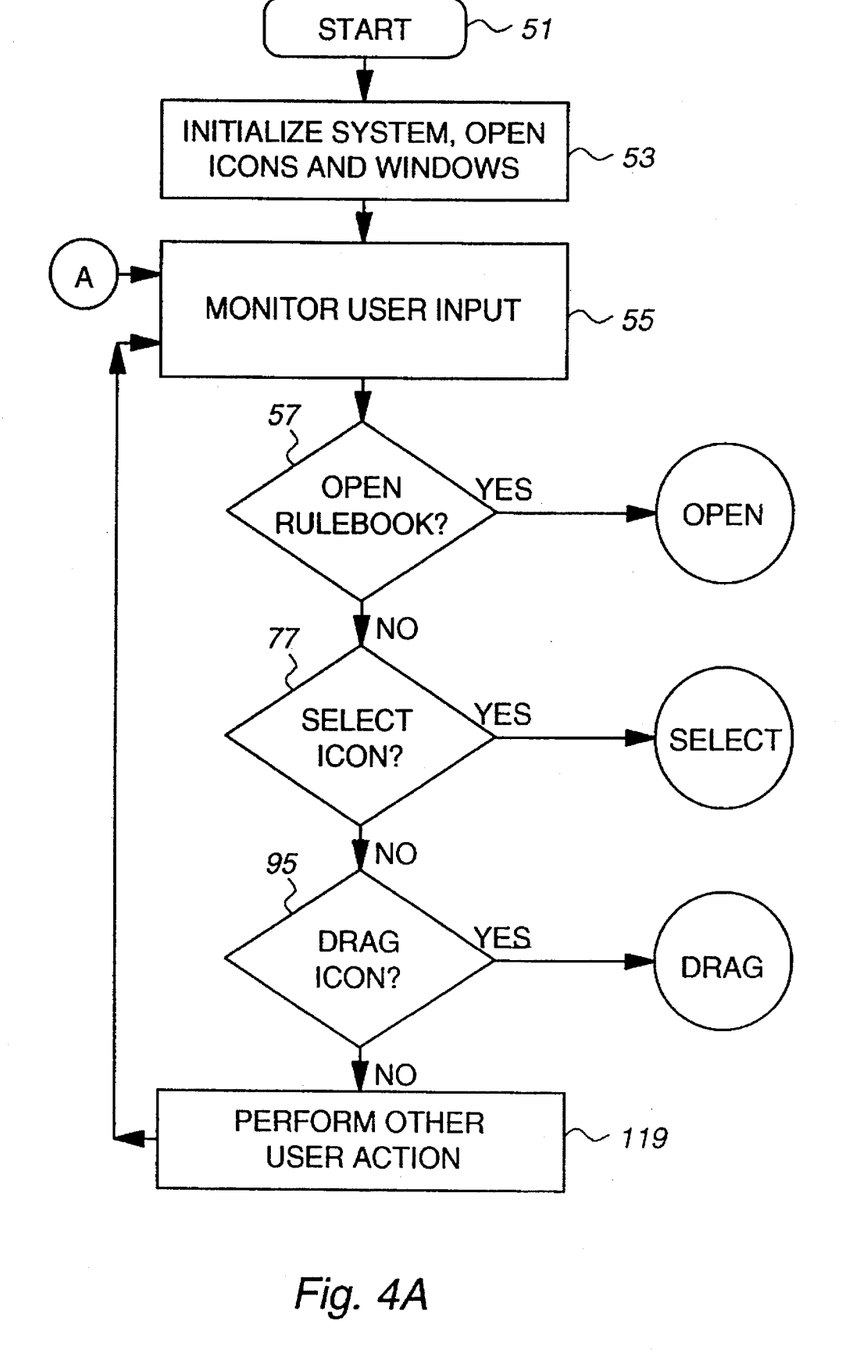
FIG. 4A shows the main method for setting up the present invention and processing user inputs.
Figure 4B:
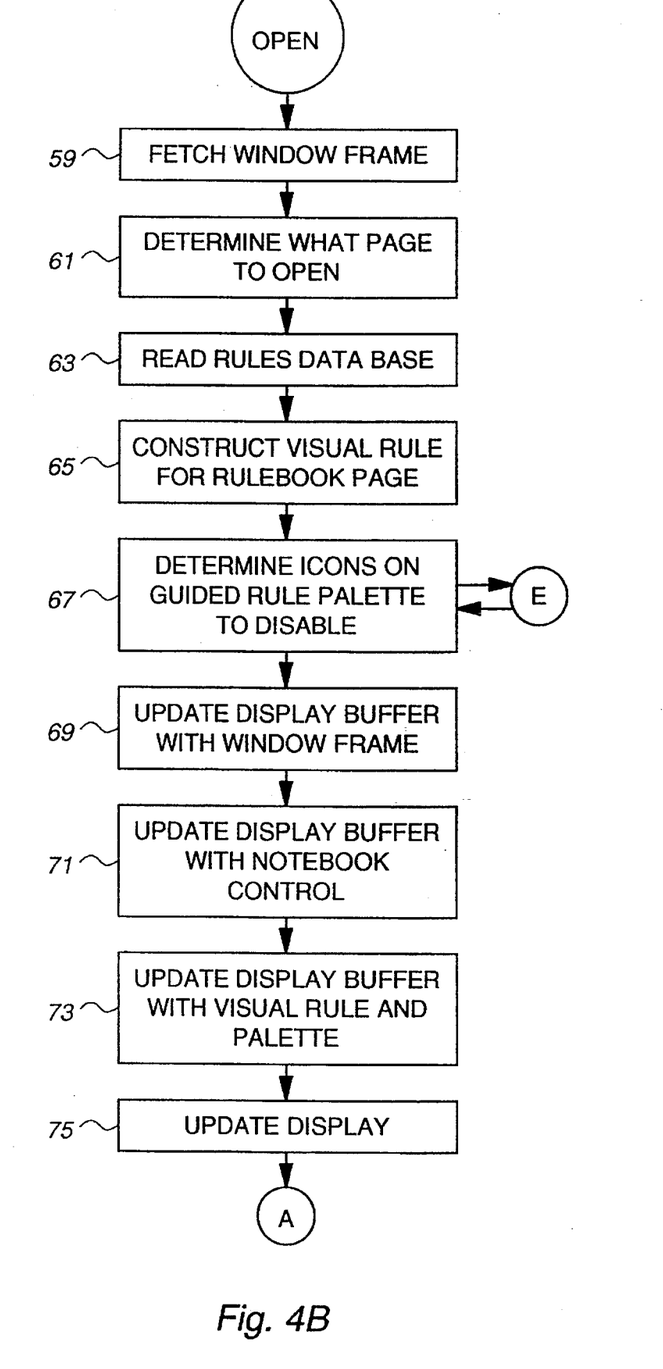
FIG. 4B shows the open method for opening the user interface shown in FIG. 2.

Task rules for an expert system are formed, modified, and implemented from a workstation 13 by the main rule formation method of FIG. 4A. A workstation user starts the workstation 13 up, or starts a particular expert system, such as an electronic mailing system, on the workstation 13, step 51. The workstation 13 or the expert system is initialized, and icons and windows are opened for operation of the workstation 13 or the expert system, step 55. The method then monitors user input at the workstation, step 55.

When a user input is received it is processed in steps 57, 77 or 95 to determine the type of input. The method first checks to see if the user input directs the method to open the Rule Book user interface 31 (see FIG. 2) that is used to form task rules for the expert system, step 57. The workstation user may direct the method to open the Rule Book by selecting an icon displayed on the workstation or by selecting a Rule Book option from a menu on the workstation. If the result of step 57 is YES, the input directs the method to open the Rule Book, then the method proceeds by way of connector "open" to step 59 in FIG. 4B.

In step 59, the method proceeds to fetch a window frame 32 (see FIG. 3) for the Rule Book. The window frame provides a background graphical display for the Rule Book 31. After fetching the window frame, the method then determines which page 37 of the notebook 34 (see FIG. 3) to open, step 61. The page to which the notebook 34 is to be opened may be set by default, for example the first page of the notebook, or the page may be selected by the workstation user. The rules contained in the notebook 34, including the rule for the page determined in step 61, are read from a Rules Data Base which stores saved rules as binary files in memory, step 63. The method then constructs a visual rule 40 (see FIG. 3) for the notebook page 37 determined in step 61 from the information retrieved from the Rules Data Base, step 65. To minimize user confusion, the Rule Book contains one rule per page 37. After constructing the visual rule, the method determines which icons on a Guided Rule Icon Palette 35 to disable based upon the rule, step 67. The method determines which icons to disable based upon the palette update method of FIG. 4E, disclosed subsequently herein. Step 67 is a call-return step.

After step 67, the method of FIG. 4B then updates the display buffer (for the display 17) to prepare for updating the visual display at the workstation. The display buffer is updated with the window frame 32, step 69. Then, the display buffer is updated with the notebook page 37, and Rule Book controls 36,38 that allow a workstation user to access multiple Rule Book pages as well as index the rules, step 71. The method then updates the display buffer with the visual rule 40 from step 65 and with the icon palette 35 from step 67, step 73. The display 17 is then updated from the display buffer, step 75. The method then returns through connectors "A" to step 55 of FIG. 4A to monitor user input at the workstation.

If the user input provided in step 55 does not direct the method to open the Rule Book 31, then the result of step 57 is NO and the method proceeds to step 77. In step 77, the method determines whether an icon 33 (see FIG. 3) on the guided rule icon palette 35 has been selected by the user input on an already open Rule Book. A user may select an icon by directing a pointer 42 on the workstation display to an icon and entering that icon as the user's selection, for example, by moving the pointer with a workstation mouse and clicking a button on the mouse to enter the selection. If the result of step 77 is YES, an icon has been selected, then the method proceeds, by way of the connectors "select" to step 79 of FIG. 4C. In step 79, the method proceeds to display the icon with selected emphasis. The selected emphasis highlights the selected icon with respect to other icons. The method then monitors the user's input for input with respect to the selected icon, step 81.

Figure 4C:
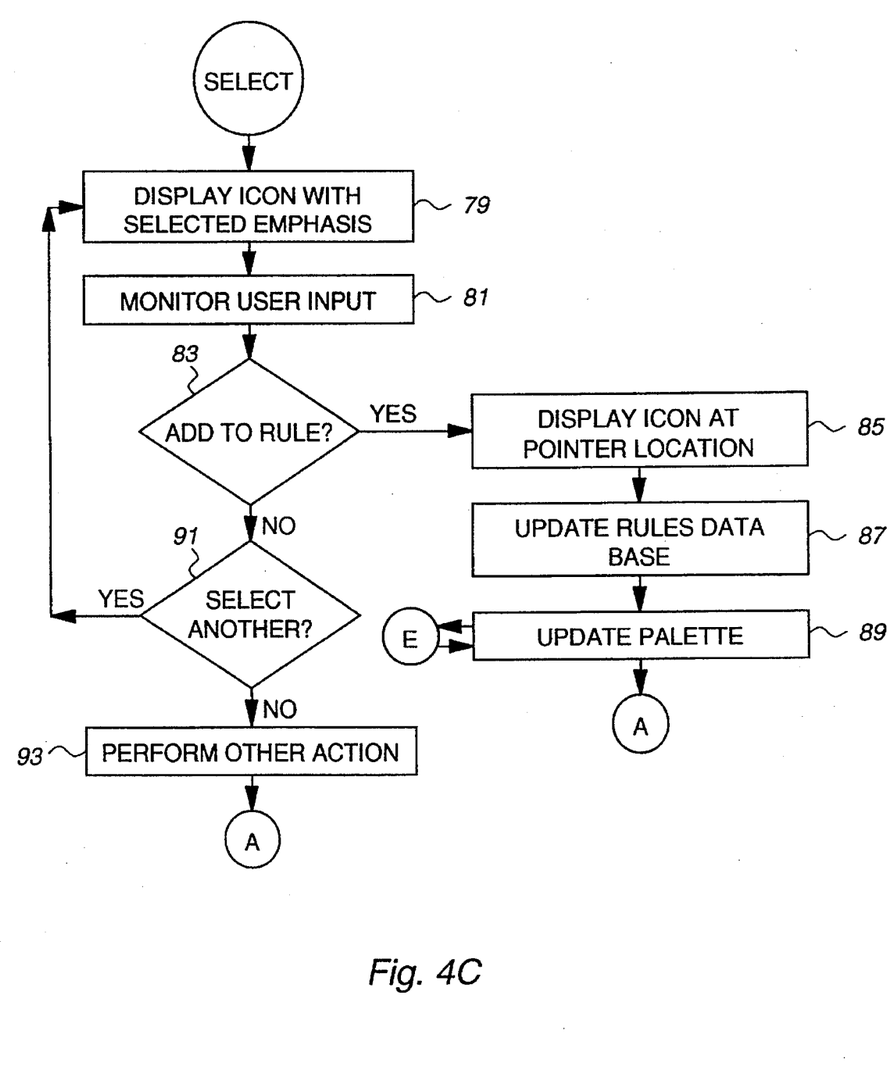
FIG. 4C shows the select method for selecting an icon.

Upon receiving a user input, the method determines whether the selected icon has been added to the rule, step 83. A workstation user may add the selected icon to the rule by dragging the icon with the mouse pointer 42 from the icon palette 35 to the notebook page 37 across the workstation display and dropping the icon onto the page by releasing the icon with the mouse. If the result of step 83 is YES, the user added an icon to the rule, then the method displays the icon at the pointer location, step 85. The pointer location is the location on the workstation display to which the icon was dragged and dropped by the user. The Rules Data Base for the Rule Book is then updated with the modified rule including the added icon, step 87. The method then calls the palette update method of FIG. 4E in a call-return, step 89. The method of FIG. 4E determines which icons on the icon palette to disable based upon the modified rule including the added icon. After step 89, the method then returns, by way of connectors "A", to step 55 of FIG. 4A, to monitor user input.

Referring back to FIG. 4C, if the result of step 83 is NO, then the user's input does not indicate that the selected icon has been added to the rule, and the method determines whether another icon was selected, step 91. If the result of step 91 is YES, then the method displays the new icon with selected emphasis, step 79, and monitors user input for an input with respect to the newly selected icon, step 81. If the result of step 91 is NO, then the method performs some other action according to the user's input, step 93, and then returns by way of connector "A" to step 55 of FIG. 4A to monitor further user input.

Returning now to FIG. 4A, if the result of step 77 is NO, the user did not select an icon, then the method determines whether the user dragged an icon in the workstation display, step 95. An icon is dragged in the display in order to remove or insert icons in the rule, or to create a copy of the icon. In order to drag an icon, a user locates the workstation pointer on the icon, and simultaneously selects the icon while moving the pointer across the display. For example, an icon may be dragged by selection and movement with a mouse pointer 42 (see FIG. 3).

Figure 4D:
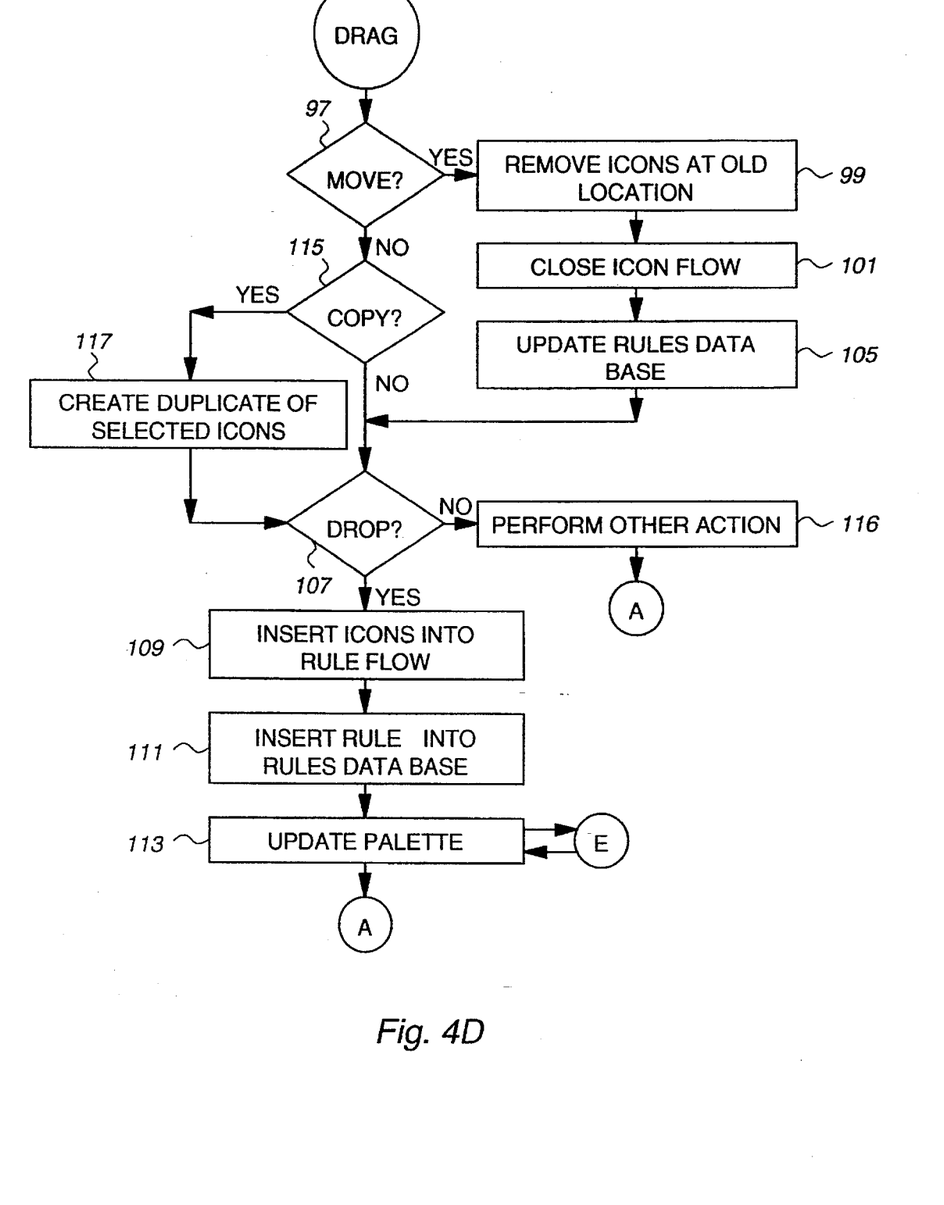
FIG. 4D shows the drag method for dragging an icon between locations on the user interface.

If the result of step 95 is YES, the user dragged an icon on the workstation display, then the method proceeds, by way of connectors "Drag" to step 97 of FIG. 4D. In step 97, the method determines whether the icon was moved from a position within the rule 46 (see FIG. 3), step 97. An icon is moved from a position within the rule in order to alter the rule by removing the icon from that position. If the result of step 97 is YES, an icon (or icons) is moved, then the method removes the icon from its old location on the notebook page 37, step 99. The method then closes the icon flow of the rule on the notebook page 37 by bringing the icons of the rule adjacent the position vacated by the removed icon together about the vacated position, step 101. For example, referring to FIG. 3, if the mail package icon 45 and the second connector right icon 47 were removed from the page 37, then step 101 would move the printer icon 49 to the position on the page formerly occupied by the mail package icon. This would close any gaps between icons on the page. The Rules Data Base is then updated to record the rule modified by removal of the moved icon, step 105.

The method then determines if the moved icon is dropped into the rule, step 107. An icon is dropped by being released from being dragged. An icon may be dropped into the rule 40 (see FIG. 3) in order to add the dropped icon to the rule at the location the icon is dropped, or the icon may be dropped outside the notebook page 37 so that the dragged icon is removed from the rule. If the result of step 107 is YES, the icon is dropped into the rule, then the method inserts the icon (or icons) into the rule flow, step 109, locating the icon at its dropped position in the display. After the icon is inserted into the rule flow the method updates the Rules Data Base to record the rule modified by insertion of the dropped icon, step 111. The method then updates the icon palette using the palette update method of FIG. 4E, step 113. After step 113, the method returns, by way of connectors "A" to step 55 of FIG. 4A to monitor user input.

Referring back to FIG. 4D, if the result of step 107 is NO, the moved icon is not dropped into the rule, then the method performs some other action, step 116. After step 116, the method returns, by way of connectors "A" to step 55 of FIG. 4A to monitor user input.

Returning now to step 97 of FIG. 4D, if the result of step 97 is NO, an icon was not moved from a position within the rule, then the method determines whether a copy of an icon was made, step 115. A copy of an icon may be made in order to duplicate the icon for positioning elsewhere within the rule. A user may make a copy by selecting a copy command on the workstation, and then selecting and dragging the icon copy to the desired location. If the result of step 115 is YES, the icon is to be copied, then the method creates a duplicate of the selected icon (or icons), step 117. The method then determines whether the copied icon is to be dropped in the rule, step 107. If the result of step 107 is YES, then the method inserts the copied icon into the rule flow, step 109; inserts the rule into the Rules Data Base, step 111; updates the icon palette, step 113; and returns to monitor user input, step 55 of FIG. 4A. If the result of step 107 is NO, then the method performs some other action, step 116 and then returns to monitor user input, step 55 of FIG. 4A.

If the result of step 115 (FIG. 4D) is NO, a copy of an icon was not made, then the method determines if the dragged icon is to be dropped into the rule, step 107. If the result of step 107 is YES, then the method inserts the icon into the rule flow, step 109; inserts the rule into the Rules Data Base, step 111; updates the icon palette, step 113; and returns to monitor user input, step 55. If the result of step 107 is NO, the method performs an other action, step 116, then returns to monitor user input, step 55.

Referring now to step 95 of FIG. 4A, if the result of step 95 is NO, the user did not drag an icon on the workstation display, then the method performs some other user action, step 119. The method then returns to monitor user input, step 55.

Figure 4E:
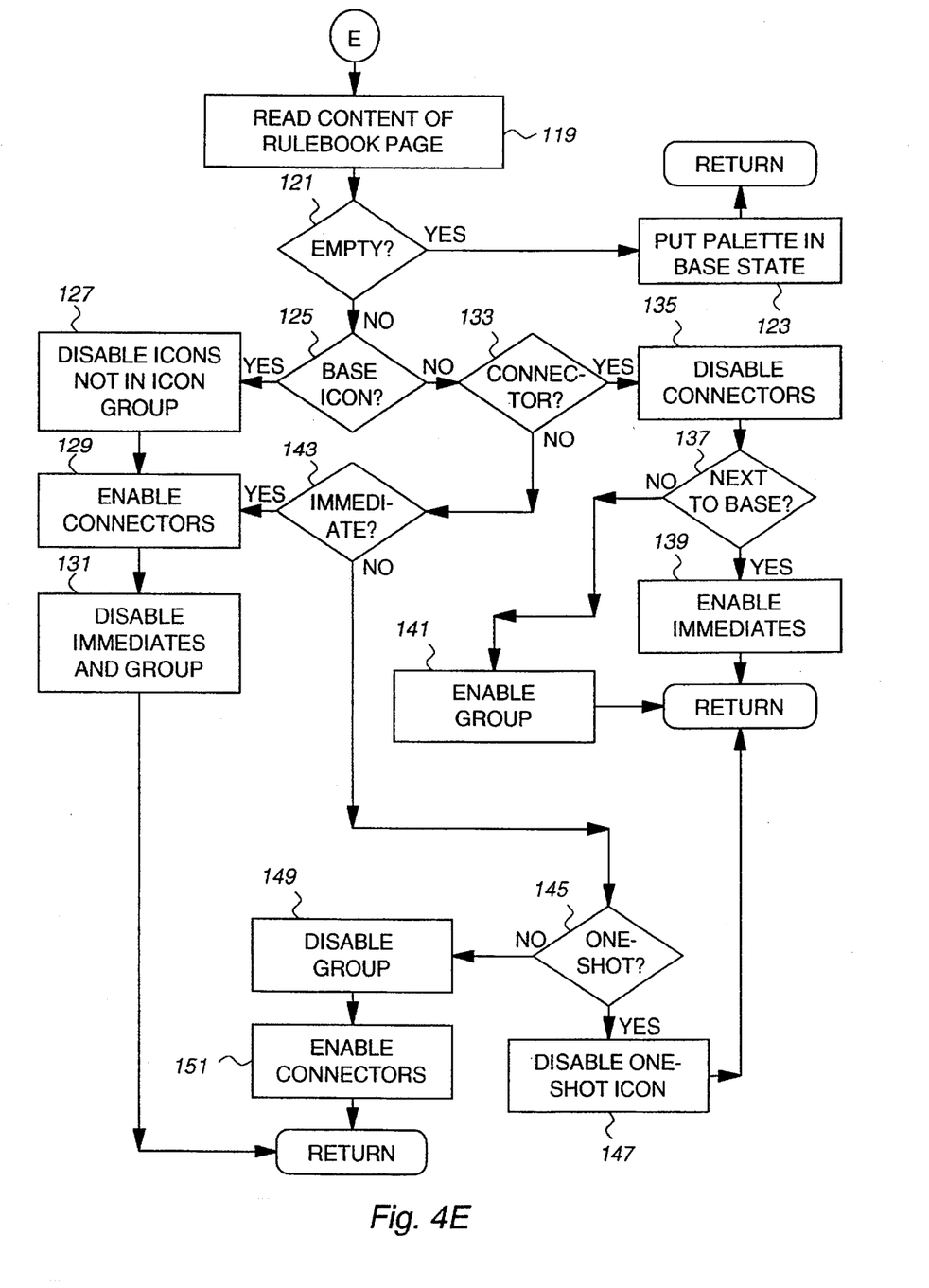
FIG. 4E shows the method for updating the icon selection palette.

As discussed above, the method frequently calls the icon palette update routine shown in FIG. 4E to update the icon palette 35 (see FIG. 3). The icon palette is updated to change the icons available for insertion into the rule 40 at the location of the workstation pointer based on changes made in the rule by the user. Available icons are enabled for user selection and are easily visible, while unavailable icons are disabled so that they may not be selected. Disabled icons are "grayed" out and are not easily visible. The updated icon palette assists the workstation user in building a proper rule by enabling the user to insert into the rule only icons that can be used to create an operable rule.

The method of FIG. 4E classifies the icons into five distinct types based upon the function or element the icon represents. These types are: base icons, immediate icons, group icons, one-shot icons, and connector icons.

Base icons represent source objects. Source objects contain other objects. For example, in the electronic mail icon palette 35 shown in FIGS. 2 and 3, the in-basket, server in-basket, and mail drawer icons represent source objects from which other objects can be retrieved or to which other objects can be sent. A mail package can be retrieved from or sent to an in-basket. Therefore, these icons are base icons.

Immediate icons represent subject objects which are to be evaluated or upon which an action is to be taken. In the electronic mail icon palette 35 the mail package icon and the file icon are immediate icons representing a mail package and a file, respectively, upon which actions may be taken, or which may be evaluated.

Group icons represent actions that may be taken on an object. In the electronic mail icon palette 35 the group icons include: the printer icon, the trash can icon, the folder icon, the reminder icon, the shredder icon, the question icon, the open package window icon, the reply icon, and the forward icon. Use of the printer icon causes an object to be printed at a printer; the trash can icon causes an object to be placed in a condition to be erased from the data system network memory; the folder icon causes an object to be saved on the data system network memory; the reminder icon causes the workstation to prompt the user upon occurrence of a specified event; the shredder icon causes an object to be erased from the data system network; the question icon causes the workstation to evaluate whether a condition has occurred; the open package window icon causes an object to be displayed on the workstation; the reply icon causes a pre-arranged reply to be sent to another user in response to a specified event; and the forward icon causes an object to be forwarded to another user.

One shot icons also represent actions that may be taken, however, a one shot icon may be used only once in a rule. In the electronic mail icon palette 35 the switch icon and the clock icon are one shot icons. The switch icon turns the rule on or off, and the clock icon may be used to set a time for invocation of the rule.

Finally, connector icons are icons used to couple actions and objects together in the rule. In the electronic mail icon palette 35, the connector down icon and the connector right icon are connector icons.

The specific icons available in a palette and their classifications and interrelationships among each other vary from one expert system to another and are defined by the specifications of the particular expert system at hand. Thus, for an expert system that does not deal with electronic mail, some icons other than those shown in FIG. 2 may be provided.

The icon palette update method, FIG. 4E, initially reads the content of the Rule Book or notebook page 37, step 119. The method then determines whether the Rule Book page 37 is empty, step 121. If the result of step 121 is YES, then the method places the palette in a base state where a subset of the icons are available for placement into a rule, step 123. The method then returns to the step in the rule formation method from which the method was called, either step 67 of FIG. 4B, 89 of FIG. 4C or 113 of FIG. 4D.

If the result of step 121 is NO, the Rule Book page is not empty, then the method determines the type of the previous icon in the rule 40. A pointer or cursor may be provided on the notebook page 37 to indicate where a next icon is to be located. Such a pointer is similar to a text location cursor. This pointer, or some other mechanism (such as the last icon in the rule) is used to identify the icon that is processed by the method of FIG. 4E. For ease of discussion herein, the icon that is processed by the method of FIG. 4E is referred to as the previous icon. For example, in FIG. 3, the previous icon is the printer icon 49.

In step 125, the method determines whether the previous icon is a base icon, step 125. If the result of step 125 is YES, then the method disables all base icons and any icons not in an icon group associated with the last base icon, step 127. Each base icon is associated with certain group icons, and in particular, those group icons representing actions that may be taken in connection with the source object represented by the base icon. For example, with the particular expert system shown in FIG. 3, the base in-basket icon 41 may be associated with the printer icon and the trash can icon (among others), but not with the questions icon. The method in step 127 disables those group icons that represent actions that cannot be taken with the base icon preceding the pointer. The method then enables the connector icons, step 129, so that the base icon may be coupled with an associated group icon or an immediate icon. The immediate icons and the group icons are then disabled, step 131. Therefore, the only icons enabled when a base icon immediately precedes the workstation pointer are connector icons. This is shown in FIG. 3. The method then returns to the step in the rule formation method from which the method was called, either step 67, 89 or 113.

If a base icon does not immediately precede the workstation pointer and, therefore, the result of step 125 is NO, and the method then determines whether a connector icon immediately precedes the workstation pointer, step 133. If the result of step 133 is YES, then the method disables the connector icons on the palette 35, step 135. This is to prevent two connector icons from being located next to each other in a rule. The method then determines whether the last connector icon is located next to a base icon, step 137. If the result of step 137 is YES, then the method enables the immediate icons on the palette so that an object may be retrieved from, or sent to, the source object represented by the base icon, step 139. The method then returns to the step in the rule formulation method from which the method was called, either step 67, 89 or 113.

If the result of step 137 is NO, the connector icon is not located next to a base icon, then the method enables those group icons on the icon palette that are associated with the base icon so that the workstation user may choose an action to be undertaken, step 141. The method then returns to the step in the rule formulation method from which the method was called, either step 67, 89 or 113.

If the result of step 133 is NO, a connector icon does not immediately precede the workstation pointer, then the method determines whether an immediate icon immediately precedes the workstation pointer, step 143. If the result of step 143 is YES, then the method enables the connector icons on the palette, step 129, disables the immediate and group icons on the palette, step 131, and then returns to the step in the rule formulation method from which the method was called, either step 67, 89 or 113.

If the result of step 143 is NO, an immediate icon does not immediately precede the workstation pointer, then the method determines whether the icon immediately preceding the workstation pointer is a one shot icon, step 145. If the result of step 145 is YES, then the method disables that particular one shot icon on the icon palette, step 147, and then returns to the step in the rule formulation method from which the method was called. Any other one shot icons on the palette are not disabled. For example, in FIG. 3, the switch icon is disabled because it has already been used in the rule 40. However, the clock icon is still enabled.

If the result of step 145 is NO, then the icon preceding the workstation pointer must be a group icon. The method then disables all the group icons on the palette, step 149, and then enables all of the connector icons, step 151. The method then returns to the step in the rule formulation method from which the method was called, either step 67, 89 or 113.

The method of FIG. 4E can also be called after a rule has been edited to provide an indication of the validity of the newly edited rule. For example, if an icon is removed from the rule, then the method could check those icons occurring after (to the right of) the removed icon to determine if the remaining icons fall within the appropriate groups. If they do not, then the improper icons on the notebook page can be grayed, thereby prompting the user to make a change in the invalid rule.

As an example of the operation of the guided rule formulation method of the current invention, a review of construction of the rule shown in FIG. 3 from the start up of an electronic mail expert system will be conducted. A workstation user starts the electronic mail system on the workstation, step 51 of FIG. 4A, which causes the method to initialize the system, open icons and windows, step 53, and monitor the user's input, step 55. The user opens the Rule Book by selecting the appropriate icon (not shown), causing the method to display the Rule Book window frame, notebook control, icon palette and a blank notebook page, steps 59–75 of FIG. 4B. The icon palette is put into its base state having all the base icons and the one-shot icons enabled by the icon palette update method, steps 119–123 of FIG. 4E, when the method is called from step 67 of FIG. 4B to determine which icons to disable on the palette. (FIG. 2 is shown for illustrative purposes, with all of the icons on the palette enabled with an empty notebook page. In practice, with an empty notebook page, only the base icons and the one-shot icons are enabled.) After opening the Rule Book, the method returns to monitoring the user input.

The user then selects the switch icon with the mouse and adds the switch icon 39 to the Rule Book page so that the rule may be turned on and off. The method determines that the switch icon was selected, step 77 of FIG. 4A, and was added to the rule, steps 79–83 of FIG. 4C. The method then displays the switch icon 39 on the workstation display at the workstation pointer location, step 85, and updates the Rules Data Base and the icon palette to reflect the addition of the switch icon, steps 87–89. To update the icon palette, the method calls the palette update method of FIG. 4E, which determines that a one shot switch icon immediately precedes the new workstation pointer location, step 145, and disables the switch icon by "graying" the icon out, step 147. All other icons on the palette 35 remain in base state. The method then returns to monitor further user input, step 55.

In the same manner, the user selects the in-basket icon 41 and the method adds it to the rule as a source object. The palette update method of FIG. 4E determines that an in-basket base icon 41 immediately precedes the workstation pointer location, step 125, and disables all base icons and icons not in the icon group associated with the base icon, as well as all immediate icons (mail package and file) and group icons (question, printer, trash can, folder, reminder, shredder, open package window, reply and forward), while enabling the connector icons (connector down and connector right), steps 127–131. The method then returns to monitor further user input, step 55.

In like manner, the user selects and the method adds the first connector icon 43. The palette update method of FIG. 4E determines that a connector immediately precedes the workstation pointer location, step 133, and disables the connector icons on the palette, step 135. The method then determines that the connector icon 43 immediately preceding the pointer is next to a base icon 41, step 137, and enables the immediate icons (mail package and file icons), step 139. The group icons remain disabled, while the one-shot clock icon remains enabled. The method then returns to monitor the user's input, step 55.

The user then selects and adds the mail package icon 45 to the rule as an object to be acted upon, and the method adds the mail package icon to the rule in the same manner as described above. The palette update method of FIG. 4E determines that an immediate mail package icon immediately precedes the workstation pointer, step 143, and therefore, enables the connector icons (connector down and connector right) while disabling the immediate and group icons, steps 127–131. The method then returns to monitor the user's input, step 55.

The user selects a second connector icon 47 to be added to the rule by the method. The palette update method of FIG. 4E determines that a connector icon immediately precedes the workstation pointer, disables the connector icons, and determines that the connector icon is not next to a base icon, steps 133–137. The method then enables the group icons for selection, step 141, and returns to monitor the user's input, step 55. The group icons that are enabled are those group icons that are in the base icon group. For example, if the question icon is not in the group for the in-basket icon, as determined by step 127 of FIG. 4E, then the question icon will be disabled.

Finally, the user selects the printer icon 49 to be added to the rule to print the contents of the mail package, and the method adds the printer icon 49 to the rule to form the completed rule. The method of FIG. 4E enables the connector icons and the clock icon as shown in FIG. 3 and disables all of the other icons.

The foregoing disclosure and the showings made in the drawings are merely illustrative of the principles of this invention and are not to be interpreted in a limiting sense.

What we claim is:

1. A method of guiding formation of correctly structured instructions for a data processing system, said instructions being executable on said data processing system, comprising the steps of:

on said data processing system, providing a set of components for constructing said instructions for said data processing system, said components comprising actions, said actions being executable on said data processing system;

providing a selection of components from said set of components from which a component may be selected for insertion into a formative instruction, said selection of components being selected from said set of components based upon component compatibility with said formative instruction such that each component of said selection of components may properly be combined with said formative instruction;

accepting a selected component from said selection of components for insertion into said formative instruction and inserting said selected component into said formative instruction thereby forming a new formative instruction;

modifying said selection of components by providing a new selection of components from said set of components for further construction of said new formative instruction, said new selection of components being selected from said set of components based upon component compatibility with said new formative instruction such that each component of said new selection of components can properly be combined with said new formative instruction.

2. The method of guiding formation of correctly structured instructions of claim 1, wherein said step of providing a set of components for constructing instructions further comprises the step of visually representing each component of said set of components with a respective identifying icon.

3. The method of guiding formation of correctly structured instructions of claim 2, wherein said step of providing a selection of components from said set of components further comprises the steps of:

enabling those components of said selection of components for selection for insertion into said formative instruction;

disabling those components of said set of components not included within said selection of components so that said disabled components cannot be selected for insertion into said formative instruction;

indicating that said disabled components are disabled from selection by reducing visibility of said identifying icons associated with said disabled components.

4. The method of guiding formation of correctly structured instructions of claim 2, wherein said step of providing a new selection of components from said set of components further comprises the steps of:

enabling those components of said new selection of components for selection for insertion into said new formative instruction;

disabling those components of said set of components not included within said new selection of components so that said disabled components cannot be selected for insertion into said new formative instruction;

indicating that said disabled components are disabled from selection by reducing visibility of said identifying icons associated with said disabled components.

5. The method of guiding formation of correctly structured instructions of claim 1, wherein said step of providing a selection of components further comprises the steps of:

enabling those components of said selection of components for selection for insertion into said formative instruction; and disabling those components of said set of components not included within said selection of components so that said disabled components cannot be selected for insertion into said formative instruction.

6. The method of guiding formation of correctly structured instructions of claim 1, wherein said step of providing a new selection of components further comprises the steps of:

enabling those components of said new selection of components for selection for insertion into said new formative instruction; and disabling those components of said set of components not included within said new selection of components so that said disabled components cannot be selected for insertion into said new formative instruction.

7. A data processing system, comprising:

means for providing a set of components on a user interface of said data processing system for constructing instructions for said data processing system; said instructions being executable on said data processing system;

means for providing a selection of components from said set of components from which a component may be selected for insertion into a formative instruction, said components of said selection of components being compatible with said formative instruction so that said components may properly be combined with said formative instruction;

means for accepting and inserting a selected component from said selection of components into said formative instruction to create a new formative instruction;

means for modifying said selection of components by providing a new selection of components from said set of components from which a component may be selected for insertion into said new formative instruction, said components of said new selection of components being compatible with said new formative instruction so that said components can properly be combined with said new formative instruction.

8. The data processing system of claim 7, further comprising means for visually representing each component of said set of components with a respective identifying icon.

9. The data processing system of claim 8, wherein said means for providing a selection of components further comprising:

means for enabling those components of said selection of components for insertion into said formative instruction;

means for disabling those components of said set of components not included within said selection of components so that said disabled components cannot be selected for insertion into said formative instruction;

means for indicating that said disabled components are disabled, said means for indicating reducing visibility of said identifying icons associated with said disabled components.

10. A user interface for a display in a data processing system, comprising:

a rule construction area;

a palette of icons for use in building a role for execution by said data processing system, said icons comprising a source object, a subject object and an action object, said source object containing other objects, said action object defining an action that is executed by the data processing system, said subject object being an object upon which said action is to be taken;

means for locating one or more of said icons from said palette to said role construction area; and means for changing said palette so as to indicate which icons are enabled for location from said palette to said rule construction area after an icon has been located in said rule construction area from said palette, said means for changing said palette comprising means for determining whether said icon that has been located in said rule construction area from said palette comprises a source object or a subject object; wherein if said icon that has been located in said rule construction area from said palette comprises a source object, then those icons in said palette that are indicated to be enabled comprise said subject object, and if said icon that has been located in said rule construction area from said palette comprises a subject object, then those icons in said palette that are indicated to be enabled comprise said action object.

11. A method for building a rule on a data processing system, said rule being executable by said data processing system, comprising the steps of:

providing a rule construction area on said display;

providing a palette of icons for use in building said rule on said display, said icons comprising a source object, a subject object and an action object, said source object containing other objects, said action object defining an action that is executed by the data processing system, said subject object being an object upon which said action is to be taken;

locating one or more of said icons from said palette to said rule construction area; and after locating one or more of said icons from said palette to said rule construction area, changing said palette so as to indicate which icons are enabled for location from said palette to said rule construction area, said step of changing said palette further comprising the step of determining whether said icon that has been located in said rule construction area from said palette comprises a source object or a subject object, wherein if said icon that has been located in said rule construction area from said palette comprises a source object, then those icons in said palette that are indicated to be enabled comprise said subject object, and if said icon that has been located in said rule construction area from said palette comprises a subject object, then those icons in said palette that are indicated to be enabled comprise said action object.

* * * * *